United States Patent

Shiraishi et al.

(10) Patent No.: US 10,346,765 B2
(45) Date of Patent: Jul. 9, 2019

(54) SUBSCRIPTION-BASED SAFETY FEATURES IN CAR SHARING

(71) Applicant: TOYOTA JIDOSHA KABUSHIKI KAISHA, Toyota-shi, Aichi-ken (JP)

(72) Inventors: Shinichi Shiraishi, San Jose, CA (US); BaekGyu Kim, Cupertino, CA (US); Masahiro Yamaura, Toyota (JP)

(*) Notice: Subject to any disclaimer, the term of this patent is extended or adjusted under 35 U.S.C. 154(b) by 392 days.

(21) Appl. No.: 15/211,199

(22) Filed: Jul. 15, 2016

(65) Prior Publication Data

US 2018/0018591 A1    Jan. 18, 2018

(51) Int. Cl.
| | |
|---|---|
| G06Q 10/02 | (2012.01) |
| H04L 29/08 | (2006.01) |
| A63F 13/803 | (2014.01) |
| A63F 13/30 | (2014.01) |
| H04L 29/06 | (2006.01) |
| B60W 50/00 | (2006.01) |

(52) U.S. Cl.
CPC ............ *G06Q 10/02* (2013.01); *A63F 13/30* (2014.09); *A63F 13/803* (2014.09); *B60W 50/0098* (2013.01); *H04L 67/12* (2013.01); *H04L 67/306* (2013.01); *H04L 67/38* (2013.01); *B60W 2050/0079* (2013.01); *B60W 2050/0082* (2013.01); *G05D 2201/0212* (2013.01)

(58) Field of Classification Search
CPC ........ G06Q 10/02; G06Q 50/14; A63F 13/30; A63F 13/803; H04L 67/12; H04L 67/306; H04L 67/38; G05D 2201/0212
See application file for complete search history.

(56) References Cited

U.S. PATENT DOCUMENTS

2005/0285756 A1* 12/2005 Shwak ............ G08G 1/096716
340/903
2013/0325521 A1* 12/2013 Jameel ................... G06Q 10/02
705/5

(Continued)

FOREIGN PATENT DOCUMENTS

EP    2355072 A2 *    8/2011    ............ G09B 9/042

OTHER PUBLICATIONS

Vetro, et al., Multimodal Input in the Car, Today and Tomorrow, IEEE Industry and Standards, Jan.-Mar. 2011, pp. 98-103.*

*Primary Examiner* — Daniel Vetter
(74) *Attorney, Agent, or Firm* — Burbage Law, P.C.; Jon-Michael Burbage; Elizabeth Ruzich

(57) ABSTRACT

The disclosure includes implementations for providing subscription-based safety features in car sharing. A method may include subscription data describing how to modify an operation of a safety system of a vehicle based on the preferences of a driver. The driver may have reserved the vehicle for their use during a time period via a car sharing service. The safety system of the vehicle may be operable to provide a plurality of safety features. Configuration data included in the safety system may define which of the plurality of safety features are provided during the operation of the vehicle. The subscription data may describe the time period when the vehicle is reserved for the driver and a subset of the plurality of safety features for the vehicle that the driver prefers to be active during the time period. The method may include modifying the configuration data based on the subscription data.

20 Claims, 8 Drawing Sheets

(56) References Cited

U.S. PATENT DOCUMENTS

| | | | |
|---|---|---|---|
| 2015/0112512 A1* | 4/2015 | Fan | H04L 67/12 |
| | | | 701/2 |
| 2016/0001720 A1* | 1/2016 | Vadgama | B60R 16/037 |
| | | | 701/2 |
| 2016/0167607 A1* | 6/2016 | Rai | H04L 67/34 |
| | | | 701/36 |
| 2016/0167608 A1* | 6/2016 | Rai | B60W 10/30 |
| | | | 701/36 |
| 2017/0282821 A1* | 10/2017 | Zych | B60R 16/037 |
| 2017/0305437 A1* | 10/2017 | Onorato | B60W 50/0098 |
| 2017/0313322 A1* | 11/2017 | Onorato | B60W 50/0098 |
| 2017/0334450 A1* | 11/2017 | Shiraishi | H04W 4/80 |

* cited by examiner

Reservation Data
198

1. Vehicle ID;
2. User ID; and
3. Reservation Time
4. Subscribed Safety Applications

SUBSCRIPTION-BASED SAFETY FEATURES IN CAR SHARING

BACKGROUND

The specification relates to subscription-based safety features in car sharing.

Car sharing services are becoming increasingly popular. These services enable users to reserve a vehicle for their use during a time period. In this way a single vehicle may provide transportation to dozens or even hundreds of different users. As a result, less people are buying vehicles and are instead replacing the convenience and expense of vehicle ownership with car sharing services.

Vehicles increasing include vehicle control systems. For example, a vehicle may be an autonomous vehicle or include an Advanced Driver Assistance System (herein an "ADAS system" if singular or "ADAS systems" if plural).

ADAS systems are frequently included in vehicles that are used for car sharing services. Although ADAS systems improve vehicle safety, different users may have different levels of comfort with different safety features provided by ADAS systems. For example, some users may not be comfortable with their vehicle making driving decisions for them and would prefer to make all driving decisions themselves. Unfortunately, the safety features provided by ADAS systems are static and not reconfigurable.

SUMMARY

A vehicle may include a safety system. The safety system may include one or more ADAS systems. These elements of the safety system may provide the safety features that are associated with vehicle ADAS systems. Some of the ADAS systems may be virtualized by one or more electronic control units.

There is currently no solution that enables a safety system of a vehicle that is available for reservation via a car sharing service to be reconfigured based on a user's preference for the operation of the safety system.

The specification relates to a subscription system that provides subscription-based safety features in car sharing. The vehicle may include a safety system. The safety system may provide a plurality of different safety features. The vehicle may have a plurality of different drivers. Different drivers may prefer that the safety system activate some safety features when they are driving the vehicle, but not other safety features. Accordingly, the driver may use the subscription system to subscribe to the safety features that they desire to be active when they are driving the vehicle. When a particular driver drives the vehicle, the subscription system may customize the operation of the safety system so that it only provides the subscribed safety features for that particular driver.

The subscription system may provide a reservation service so that drivers may reserve time slots when they may drive the vehicle.

The subscription system may provide a simulation environment in which a driver may use their smartphone (or some other processor-based computing device) to virtually test drive the vehicle in the simulation environment so that they may test the operation of the vehicle when it is configured in accordance with their subscribed safety features. The driver may decide to subscribe to different safety features based on this virtual test drive and update their subscriptions accordingly.

Example implementations of the subscription system are now described.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a system including: a vehicle communicatively coupled to a reservation server via a wireless network; and a client device communicatively coupled to the reservation server via the wireless network; where the client device includes a client module that is operable to receive one or more inputs from a driver that define user profile data for the driver and reservation data for the driver, where the reservation data describes a time period when the vehicle is reserved for the driver and the user profile data describes a subset of a plurality of safety features for the vehicle that the driver prefers to be active during the time period; where the client module is operable to provide the reservation data and the user profile data to the wireless network; where the reservation server includes a server subscription system that is operable to receive the reservation data and the user profile data from the wireless network and generate subscription data for the vehicle based on the reservation data and the user profile data and transmit the subscription data to the vehicle via the wireless network; where the subscription data describes the time period when the vehicle is reserved for the driver and the subset of the plurality of safety features for the vehicle that the driver prefers to be active during the time period; where the vehicle includes a safety system and a vehicle subscription system; where the safety system is operable to provide the plurality of safety features for an operation of the vehicle based on configuration data that defines which of the plurality of safety features are provided by the safety system during the operation of the vehicle during the time period; and where the vehicle subscription system is operable to receive the subscription data from the wireless network and modify the configuration data for the safety system based on the subscription data before the time period so that the safety system provides the subset of the plurality of safety features selected by the driver during the time period when the vehicle is reserved for use by the driver. Other embodiments of this aspect include corresponding computer systems, apparatus, and computer programs recorded on one or more computer storage devices, each configured to perform the actions of the methods.

Implementations may include one or more of the following features. The system where the vehicle includes a processor and the safety system includes code and routines that are operable, when executed by the processor, to cause the processor to generate a plurality of in-vehicle virtual electronic control units that are programmed to provide the subset of the plurality of safety features based on the configuration data as modified by the subscription system. The system where the safety system includes a plurality of subsystems that provide the safety features, and the plurality of subsystems include two or more of the following: an adaptive cruise control system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; a pre-crash safety system; and a wrong-way driving warning system. The system where the reservation server is operated by a car sharing service. The system where the vehicle is available for reservation by a plurality of users through the car sharing service. The system where the client device includes a smartphone and the client module includes a smartphone application for the car sharing service. The system where the reservation server includes a game engine that is operable to provide a simulated driving experience for a virtual version of the vehicle that is modified based on the subset of the plurality of safety features for the vehicle that the driver prefers to be active and the client module is operable to communicate with the game engine via the wireless network to receive graphical data from the game engine that causes the client module to display interactive graphical images on the client device which provide the simulated driving experience to the driver so that the driver can confirm correctness of the user profile data prior to the time period. Implementations of the described techniques may include hardware, a method or process, or computer software on a computer-accessible medium.

One general aspect includes a system including: a vehicle including a safety system, a subscription system and a communication unit; where the safety system is operable to provide a plurality of safety features for an operation of the vehicle based on configuration data that defines which of the plurality of safety features are provided by the safety system during the operation of the vehicle; where the communication unit receives user profile data from a wireless network and the user profile data describes a set of safety features to be activated when a driver operates the vehicle and the set of safety features are selected by the driver from the plurality of safety features so that the safety system operates in accordance with one or more preferences of the driver; where the subscription system is communicatively coupled to the communication unit to receive the user profile data from the communication unit and modify the configuration data based on the user profile data so that the safety system provides the set of safety features selected by the driver from the plurality of safety features so that the safety system operates in accordance with the one or more preferences of the driver. Other embodiments of this aspect include corresponding computer systems, apparatus, and computer programs recorded on one or more computer storage devices, each configured to perform the actions of the methods.

One general aspect includes a method for providing subscription-based safety features in car sharing, the method including: receiving, by a communication unit of a vehicle, a wireless message from a wireless network, where the wireless message includes subscription data describing how to modify an operation of a safety system of the vehicle based on one or more preferences of a driver for the operation of the safety system, where the driver has reserved the vehicle for their use during a time period via a car sharing service, the safety system is operable to provide a plurality of safety features during the operation of the vehicle based on configuration data that defines which of the plurality of safety features are provided by the safety system during the operation of the vehicle and the subscription data describes the time period when the vehicle is reserved for the driver and a subset of the plurality of safety features for the vehicle that the driver prefers to be active during the time period; and modifying, by a processor of the vehicle, the configuration data of the safety system based on the subscription data, where the modifying of the configuration data results in the safety system providing only the subset of the plurality of safety features when the vehicle is operated during the time period so that the operation of the safety system during the time period conforms to one or more safety features which the driver has subscribed to when reserving the vehicle with the car sharing service. Other embodiments of this aspect include corresponding computer systems, apparatus, and computer programs recorded on one or more computer storage devices, each configured to perform the actions of the methods.

Implementations may include one or more of the following features. The method further including analyzing, by the processor of the vehicle, the subscription data to determine which portions of the configuration data to modify based on the subscription data to conform to the one or more preferences of the driver as described by the subscription data, where the modifying of the configuration data by the processor of the vehicle occurs responsive to the determination of which portions of the configuration data to modify so that the operation of the safety system conforms with the one or more preferences of the driver. The method where the configuration data as modified, when executed by the processor, causes the processor to generate a plurality of in-vehicle virtual electronic control units that are programmed to provide the subset of the plurality of safety features based on the configuration data as modified by the processor. The method where the safety system includes a plurality of subsystems that provide the safety features, and the plurality of subsystems include two or more of the following: an adaptive cruise control system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; a pre-crash safety system; and a wrong-way driving warning system. The method where the car sharing service operates a reservation server that provides the wireless message. The method where the vehicle is available for reservation by a plurality of users through the car sharing service. The method where the driver has a smartphone that includes a smartphone application that is operable to reserve the vehicle with the car sharing service. The method further including a reservation server that receives user profile data from the driver describing the one or more safety features which the driver has subscribed to when reserving the vehicle with the car sharing service, where the reservation server generates the subscription data based at least in part on the user profile data and provides the wireless message including the subscription data to the wireless network. The method further including a client module that is operable by a client device of the driver, where the reservation server includes a game engine that is operable to provide a simulated driving experience for a virtual version of the vehicle that is modified based on the subset of the plurality of safety features for the vehicle that the driver prefers to be active and the client module is operable to communicate with the game engine via the wireless network to receive graphical data from the game engine that causes the client module to display interactive graphical images on the client device which provide the simulated driving experience to the driver so that the driver can confirm correctness of the user profile data prior to the time period. Implementations of the described techniques may include hardware, a method or process, or computer software on a computer-accessible medium.

One general aspect includes a computer program product of a vehicle including a non-transitory memory storing computer-executable code that, when executed by a processor of the vehicle, causes the processor to: receive subscription data describing how to modify an operation of a safety system of the vehicle based on one or more preferences of a driver for the operation of the safety system, where a driver has reserved the vehicle for their use during a time period, the safety system is operable to provide a plurality of safety features during the operation of the vehicle based on configuration data that defines which of the plurality of safety features are provided by the safety system during the operation of the vehicle and the subscription data describes the time period when the vehicle is reserved for the driver and a subset of the plurality of safety features for the vehicle that the driver prefers to be active during the time period; and modifying, by a processor of the vehicle, the configuration data of the safety system, where the modifying of the configuration data configures the safety system to provide only the subset of the plurality of safety features when the vehicle is operated during the time period so that the operation of the safety system during the time period conforms to one or more safety features which the driver has subscribed to when reserving the vehicle. Other embodiments of this aspect include corresponding computer systems, apparatus, and computer programs recorded on one or more computer storage devices, each configured to perform the actions of the methods.

Implementations may include one or more of the following features. The computer program product where the configuration data as modified, when executed by the processor of the vehicle, causes the processor to generate a plurality of in-vehicle virtual electronic control units that are programmed to provide the subset of the plurality of safety features based on the configuration data as modified by the processor of the vehicle. The computer program product further including a smartphone application that is included in a smartphone of the driver and a reservation server that is operated by a car sharing service, where the smartphone application is communicatively coupled to the reservation server via a wireless network, where the driver provides inputs to the smartphone application via the smartphone that define (1) reservation data that describes the time period for reserving the vehicle for the driver and (2) user profile data that describes the subset of the plurality of safety features for the vehicle that the driver prefers to be active during the time period, where the smartphone application transmits the user profile data and the reservation data to the reservation server via the wireless network to reserve the vehicle with the car sharing service during the time period and cause the safety system of the vehicle to be configured based on the user profile data, where the subscription data is generated by the reservation server based on the reservation data and the user profile data, where the reservation server includes a game engine that is operable to provide a simulated driving experience including a virtual version of the vehicle that is modified based on the subset of the plurality of safety features for the vehicle that the driver prefers to be active and the smartphone application is operable to communicate with the game engine via the wireless network to receive graphical data from the game engine that causes the smartphone to display interactive graphical images on the smartphone which provide the simulated driving experience to the driver so that the driver has an opportunity to ascertain a correctness of the user profile data and provide an input describing the correctness of the user profile data prior to the time period associated with their reservation of the vehicle based on a performance of the virtual version of the vehicle in the simulated driving experience provided by the game engine. Implementations of the described techniques may include hardware, a method or process, or computer software on a computer-accessible medium.

In some implementations, the driver subscribes to a subset of the plurality of safety features provided by a vehicle's safety system. The driver may then pay the car sharing service a price that is based in part on which safety features are included in their subscription. In this way, the driver may increase or decrease the cost of reserving the vehicle for a time period based on which safety featured are provided by the safety system during the reserved time period.

In some implementations, the subscription system may predict the day and time period for the reservation based on one or more of the driver's historical usage of the car sharing service and the driver's electronic calendar showing their appointments and the geographic locations of these appointments. The safety system may proactively configure the safety system of a vehicle reserved for the user based on the stored user profile data for the user so that the vehicle is prepared for the use prior to their predicted use of the vehicle.

In some implementations, the safety system of a vehicle may provide its functionality using virtualized hardware. For example, the virtualized hardware may include one or more of the following: a virtualized processor; a virtualized memory; a virtualized network; one or more virtualized sensors; one or more virtualized actuators; one or more virtualized ADAS systems; and one or more other virtualized vehicle components (any conventional vehicle hardware, software or firmware may be virtualized in this way). For example, the safety system may include one or more of a hypervisor or a virtual machine monitor that is stored in a non-transitory memory of the safety system. A processor may execute the hypervisor or the virtual machine monitor and, responsive to this execution, the hypervisor or the virtual machine monitor may cause the processor to create and run one or more virtual machines that provide the virtualized hardware which are operable to provide one or more of the safety features described herein. In some implementations, for this virtualization, the same application can be deployed among different kinds of vehicle platforms as different virtual runtime platforms.

In some implementations, the driver may test drive a virtualized version of the vehicle that is modified based on their preferences for the safety features as described by their user profile data or the subscription data related to their reservation. For example, they may execute a simulation including the virtualized version of the vehicle using a game console, smartphone, laptop, tablet computer or some other processor-based computing device.

In some implementations, the safety system may be deployed for vehicles which are owned by particular users but used by other users. For example, a head of a household may own a vehicle that is shared among other members of their household who may have different preferences for the safety system of the vehicle than other users of the household. The safety system may configure the vehicle based on the different preferences of the household.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

An automotive system may include a vehicle. Vehicles increasingly include vehicle control systems. For example, a vehicle may be an autonomous vehicle or include an Advanced Driver Assistance System (herein an "ADAS system"). An ADAS system may provide one or more safety features.

Examples of ADAS systems include the following: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

A vehicle may include a plurality of ADAS systems. These ADAS systems may provide a plurality of safety features. These ADAS systems may be included in a safety system of a vehicle. The safety system may include one or more of the following: one or more onboard vehicle computers; the plurality of ADAS systems; and one or more virtualization modules.

The one or more onboard vehicle computers may include one or more electronic control units ("ECU" if singular, "ECUs" if plural).

In some implementations, one or more of the ADAS systems may be provided by a virtual machine that virtualizes the operation of one or more hardware, software or firmware components to provide the functionality of an ADAS systems in the real world. For example, the virtualization module may include one or more a hypervisor and a virtual machine monitor that is stored in a non-transitory memory of the safety system. A processor (e.g., a processor of an onboard vehicle computer or an ECU) may execute the hypervisor or the virtual machine monitor and, responsive to this execution, the hypervisor or the virtual machine monitor may cause the processor to create and run one or more virtual machines that provide virtualized hardware which are operable to provide a virtualized version of an ADAS system that provides one or more of the safety features described herein. In some implementations, for this virtualization, the same application can be deployed among different kinds of vehicle platforms as different virtual runtime platforms.

Figure 1A:
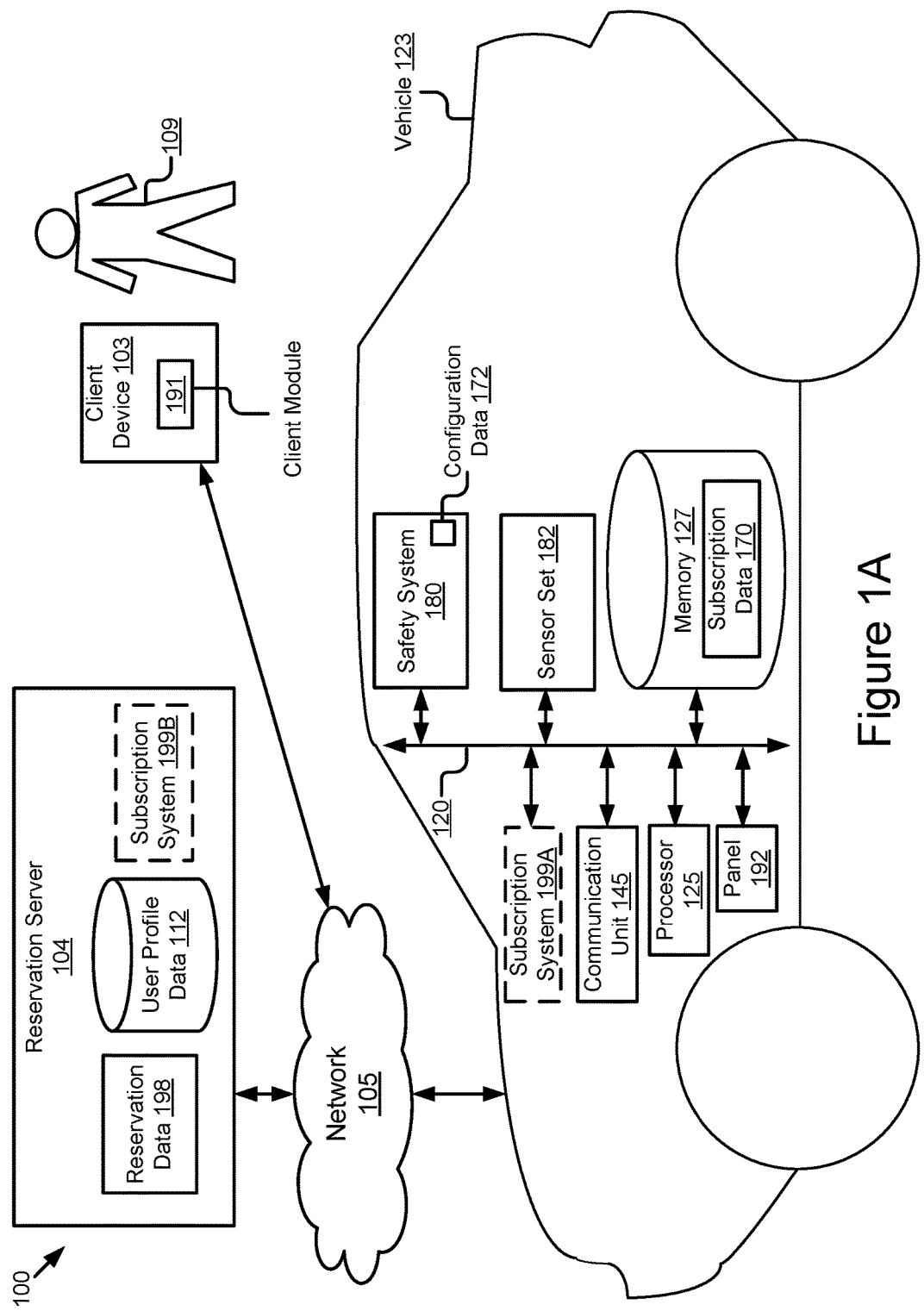
FIG. 1A is a block diagram illustrating an operating environment for a subscription system according to some implementations.

Referring now to FIG. 1A, depicted is a block diagram illustrating an operating environment 100 for a subscription system 199A, 199B according to some implementations.

In some implementations, the operating environment 100 may include one or more of the following elements: the vehicle 123; a reservation server 104; a client device 103; and a driver 109. These elements may be communicatively coupled to a network 105.

In some implementations, a subscription system 199A, 199B may be an element of one or more of the reservation server 104 and the vehicle 123. The subscription system 199A, 199B may be referred to collectively or individually as the "subscription system 199." The subscription system 199 is described in more detail below with reference to FIG. 2. When present in the vehicle 123, the subscription system 199 may be referred to as a "vehicle subscription system 199A." When present in a reservation server 104, the subscription server 199 may be referred to as a "server subscription system 199B."

In some implementations, the operating environment 100 may include one or more subscription systems 199. For example, in some implementations the subscription system 199A of the vehicle 123 may provide all or some of the functionality of the subscription system 199 as described below. In another example, the subscription system 199B of the reservation server 104 may provide all or some of the functionality of the subscription system 199 as described below. In yet another example, the subscription system 199A of the vehicle 123 may provide a portion of the functionality of the subscription system 199 as described below while the subscription system 199B of the reservation server 104 provides a portion of the functionality of the subscription system 199 as described below.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some implementations, the network 105 may include a peer-to-peer network. The network 105 may also be coupled to or may include portions of a telecommunications network for sending data in a variety of different communication protocols. In some implementations, the network 105 includes Bluetooth communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, etc. The network 105 may also include a mobile data network that may include third-generation (3G), fourth-generation (4G), long-term evolution (LTE), Voice-over-LTE ("VoLTE") or any other mobile data network or combination of mobile data networks. Further, the network 105 may include one or more IEEE 802.11 wireless networks.

In some implementations, the network 105 may include one or more communication channels shared among the vehicle 123 and one or more other wireless communication devices. The communication channel may include DSRC, full-duplex wireless communication (as described in U.S. patent application Ser. No. 14/471,387 filed on Aug. 28, 2014 and entitled "Full-Duplex Coordination System," the entirety of which is hereby incorporated by reference) or any other wireless communication protocol. For example, the network 105 may be used to transmit a full-duplex wireless message, a DSRC message, a DSRC probe or basic safety message to one or more of the vehicle 123, the reservation server 104 and the client device 103.

The client device 103 may include a processor-based computing device operated by the driver 109. For example, the client device 103 may include a smartphone, laptop, tablet computing device, personal computer, set-top box, smartwatch or any other processor-based computing device. The client device 103 may include a processor (similar to the processor 125 described below), a non-transitory memory (similar to the memory 127 described below) and hardware or software configured to enable the client device 103 to communicate with the network 105 (similar to the communication unit 145 described below).

The driver 109 may include a human user of the client device 103 or the vehicle 123.

The client device 103 may include a client module 191. The client module 191 may include code and routines that are configured to communicate with the reservation server 104 or the vehicle 123 via the network 105 when executed by the processor of the client device 103. For example, the processor of the client device 103 may access the client module 191 stored on the non-transitory memory of the client device 103 and the processor may execute the client module 191. The client module 191 may cause the client device 103 to display a graphical user interface ("GUI") usable by the driver 109 to provide one or more inputs to the client module 191. The one or more inputs may include reservation data 198. The reservation data 198 may describe a day and time period for reserving the vehicle 123 for use by the driver 109. The one or more inputs may also include user profile data 112. The user profile data 112 may describe the preferences of the driver 109 for the operation of the safety system 180. For example, the safety system 180 of the vehicle 123 may provide a plurality of safety features and the user profile data 112 may describe a subset of a plurality of safety features which the driver 109 prefers to be active during the time period when the vehicle is reserved for use by the driver 109. The client module 191 may transmit the reservation data 198 and the user profile data 112 to the reservation server 104 (or, alternatively, the vehicle 123) via the network 105.

In some implementations, the reservation server 104 may be operated by a car sharing service that provides a plurality of users such as the driver 109 with access to the vehicle 123 (sometimes referred to as "carsharing"). The subscription system 199 of the reservation server 104 may generate subscription data 170 based on one or more of the reservation data 198 and the user profile data 112. The subscription data 170 may describe (1) a day and time when a particular vehicle 123 is reserved for a particular driver 109 and (2) that driver's preferences for the operation of the safety system 180 of the vehicle 123. The subscription system 199 may then transmit the subscription data 170 to the vehicle 123. The subscription system 199 of the vehicle 123 may reconfigure the safety system 180 of the vehicle 123 based on the subscription data 170 prior to the day and time of the reservation. The reservation server 104 is described in more detail below.

In some implementations, the client module 191 may include a smartphone application (or some other thin client) that is published by the car sharing service for operation on client devices (such as the client device 103) so that users (such as the driver 109) may reserve the vehicle 123 (as well as potentially other vehicles such as the vehicle 123) for their use.

The vehicle 123 may include a car, a truck, a sports utility vehicle, a bus, a semi-truck, a drone or any other roadway-based conveyance that includes a communication unit 145 and a safety system 180. In some implementations, the vehicle 123 may include an autonomous vehicle or a semi-autonomous vehicle.

The vehicle 123 may include one or more of the following elements: a communication unit 145; a safety system 180; a processor 125; a memory 127; a subscription system 199; a sensor set 182; and a panel 192. These elements may be communicatively coupled to one another via a bus 120.

The communication unit 145 may include hardware that transmits and receives data to and from the network 105. In some implementations, the communication unit 145 includes a port for direct physical connection to the network 105 or to another communication channel. For example, the communication unit 145 includes a USB, SD, CAT-5, or similar port for wired communication with the network 105. In some implementations, the communication unit 145 includes a wireless transceiver for exchanging data with the network 105 or other communication channels using one or more wireless communication methods, including IEEE 802.11, IEEE 802.16, Bluetooth, or another suitable wireless communication method.

In some implementations, the communication unit 145 includes a port for direct physical connection to the network 105 or to another communication channel. For example, the communication unit 145 includes a USB, SD, CAT-5, or similar port for wired communication with the network 105.

In some implementations, the communication unit 145 includes a wireless transceiver for exchanging data with the network 105 or other communication channels using one or more wireless communication methods, including: IEEE 802.11; IEEE 802.16, Bluetooth; EN ISO 14906:2004 Electronic Fee Collection—Application interface EN 12253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some implementations, the communication unit 145 may include a full-duplex coordination system as described in in U.S. patent application Ser. No. 14/471,387 filed on Aug. 28, 2014 and entitled "Full-Duplex Coordination System."

In some implementations, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

The safety system 180 may include one or more advanced driver assistance systems (herein "ADAS system" if singular or "ADAS systems" if plural). These one or more ADAS systems may each provide one or more safety features.

The ADAS systems included in the safety system 180 may include one or more of the following: an adaptive cruise control system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; a pre-crash safety system; and a wrong-way driving warning system.

In some implementations, one or more of the ADAS systems included in the safety system 180 may be virtualized. For example, the safety system 180 may include one or more hypervisors. Alternatively, or in addition, the safety system 180 may include one or more virtual machine monitors. The one or more hypervisors and/or the one or more virtual machine monitors may be stored in a non-transitory memory of the safety system 180 or the vehicle 123 (e.g., the memory 127). A processor of the safety system 180 or the vehicle 123 (e.g., the processor 125) may execute a hypervisor or a virtual machine monitor and, responsive to this execution, the hypervisor or the virtual machine monitor may cause the processor to create and run one or more virtual machines that provide virtualized hardware which is operable to provide one or more of the safety features described herein.

The safety system 180 may provide a plurality of safety features. The safety features provided by the safety system 180 may include one or more of the following: adaptive cruise control for the vehicle 123 such as provided by an adaptive cruise control system; adaptive high beams for the vehicle 123 such as provided by an adaptive high beam system; adaptive lights for the vehicle 123 such as provided by an adaptive light control system; automatic or semi-automatic vehicle parking for the vehicle 123 such as provided by an automatic parking system; night vision for the vehicle 123 such as provided by an automotive night vision system; blind spot monitoring, detection and notification for the vehicle 123 such as provided by a blind spot monitor; risk of collision monitoring for the vehicle 123, risk of collision detection for the vehicle 123, risk of collision notification for the vehicle 123 and temporary automated driving of the vehicle 123 to avoid a collision such as provided a collision avoidance system, a forward collision warning system. a pedestrian protection system or a pre-crash safety system; crosswind monitoring, crosswind detection and crosswind stabilization for the vehicle 123 such as provided by a crosswind stabilization system; driver drowsiness monitoring, driver drowsiness detection and automated driving or braking of the vehicle 123 such as provided by a driver drowsiness detection system; monitoring of driver attentiveness, detection of driver lack of attentiveness detection, notification of driver regarding a safety risk relating to their lack of attentiveness and automated driving or braking of the vehicle 123 such as provided by a driver monitoring system; monitoring of driver behavior, detection of driver behavior associated with a safety risk, notification of driver regarding a safety risk relating to their behavior and automated driving or braking of the vehicle 123 such as provided by an emergency driver assistance system; monitoring of traffic at an intersection or in an oncoming lane or traffic, detection of a risk of collision at the intersection or by turning into the oncoming lane of traffic, notifying the driver of the risk of collision and automated driving or braking of the vehicle 123 to reduce the risk or collision or avoid an impending collision such as provided by an intersection assistance system or a turning assistant; ensuring that the speed of the vehicle 123 does not exceed a safe or legally enforced speed such as provided by an intelligent speed adaption system; warning the driver of the vehicle 123 when the vehicle begins to move out of its lane (unless a turn signal is on in that direction) such as provided by a lane departure warning system; traffic sign detection, driver notification of non-compliance or risk of non-compliance and automated or semi-automated driving or braking of the vehicle 123 to ensure compliance with the traffic sign such as provided by a traffic sign recognition system; monitoring of whether the vehicle 123 is driving in the wrong lane, notification to the driver of an event where the driver is driving in the wrong lane and automated driving or braking of the vehicle 123 to avoid a collision or correct a heading of the vehicle 123 to conform with the flow of traffic such as provided by a wrong-way driving warning system.

The safety system 180 may include or be communicatively coupled to a non-transitory memory (such as the memory 127) that stores the configuration data 172. The configuration data 172 may control, define or affect which of the plurality of safety features are provided by the safety system 180 during the operation of the vehicle 123. For example, modifying the configuration data 172 may result in the safety system 180 providing a subset of the plurality of safety features. The subscription system 199 may be communicatively coupled to the safety system 180 (e.g., via the bus 120) to access the non-transitory memory of the safety system 180 and modify the configuration data 172 of the safety system 180. For example, the subscription system 199 may modify the configuration data 172 based on the subscription data 170 so that the safety system 180 provides a subset of the plurality of safety features based on a preference of the driver 109.

The processor 125 includes an arithmetic logic unit, a microprocessor, a general purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. Although FIG. 1A includes a single processor 125, multiple processors may be included. The processor 125 may include a graphical processing unit. Other processors, operating systems, sensors, displays, and physical configurations may be possible.

In some implementations, the processor 125 may be an element of an onboard vehicle computer or an ECU of the vehicle 123.

The memory 127 stores instructions or data that may be executed by the processor 125. The instructions or data may include code for performing the techniques described herein. The memory 127 may be a dynamic random access memory (DRAM) device, a static random access memory (SRAM) device, flash memory, or some other memory device. In some implementations, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 1A, the memory 127 stores the subscription data 170. The subscription data 170 may describe one or more of the following: (1) a time period when the vehicle 123 is reserved for use by the driver 109; and (2) a subset of the plurality of safety features provided by the safety system 180 that the driver 109 prefers to be active during the time period when the vehicle 123 is reserved for use by the driver 109. For example, the subscription data 170 may indicate that (1) the vehicle 123 is reserved for use by the driver 109 between 11:00 PM on May 10, 2014 and 11:59 PM on May 11, 2014 and (2) the driver 109 prefers if the following safety features of the safety system 180 be active during this time period: adaptive cruise control provided by the adaptive cruise control system; collision avoidance provided by the collision avoidance system; and turning assistance provided by the turning assistant.

In some implementations, the memory 127 may store one or more of the following: the subscription system 199; one or more software elements of the safety system 180; sensor data collected by the sensor set 182; and graphical data for causing the panel 192 to display one or more GUIs.

In some implementations, the subscription system 199 may include code and routines that are operable, when executed by the processor 125, to cause the processor 125 to perform one or more of the following steps: receive the user profile data 112 from the network 105; receive the reservation data 198 from the network 105 (the user profile data 112 and the reservation data 198 may be received at different times); and generate the subscription data 170.

In some implementations, the subscription system 199 may include a configuration table. The configuration table may include data that describes, for different makes and models of vehicles 123, the safety features of these vehicles 123 and the configuration data 172 of these vehicles 123. The subscription system 199 may analyze the configuration table with the user profile data 112 to determine how to modify the configuration data 172 for the vehicle 123 so that the safety system 180 of the vehicle provides the safety features requested by the driver 109. The subscription system 199 may generate the subscription data 170 based on this analysis and the reservation data 198. In this way, the subscription system 199 may generate subscription data 170 that is operable to modify the configuration data 172 for a reserved vehicle 123 so that the safety system 180 for the reserved vehicle 123 operates in conformity with one or more preferences of the driver 109 for the operation of the safety system 180 of the reserved vehicle 123.

In some implementations, the subscription system 199 as described in the preceding two paragraphs may be an element of the reservation server 104 or the vehicle 123.

In some implementations, the subscription system 199 may be an element of the vehicle 123. The subscription system 199 may include code and routines that are operable, when executed by the processor 125, to cause the processor 125 to perform one or more of the following steps: receive the subscription data 170; store the subscription data 170 in the memory 127; identify how to change the configuration data 172 so that the safety system 180 operates in conformity with the preferences of the driver 109 during the time period of the driver's reservation as described by the subscription data 170 (e.g., based on the configuration table); modify the configuration data 172; monitor the current time relative to the time period of the reservation as described by the subscription data 170; determine that the time period of the reservation is ended; and modify the configuration data 172 so that it is set to a default setting.

In some implementations, the subscription system 199 may include code and routines that are operable, when executed by the processor 125, to cause the processor 125 to perform one or more of the following steps: generate graphical data for causing the panel 192 to display a GUI upon the vehicle 123 being powered on (e.g., at the beginning of the time period for the reservation or the first time the driver 109 powers on the vehicle 123 during the time period of the reservation), wherein the GUI includes a message describing the vehicle 123 as being customized for the driver 109; providing the graphical data to the panel 192; and displaying the GUI via the panel 192 for viewing by the driver 109.

The subscription system 199 may include a thin client that is executed by an infotainment system of the vehicle 123 or some other processor-based computing device of the vehicle 123.

In some implementations, the subscription system 199 may be implemented using hardware including a field-programmable gate array ("FPGA") or an application-specific integrated circuit ("ASIC"). In some other implementations, the subscription system 199 may be implemented using a combination of hardware and software. The subscription system 199 may be stored in a combination of the devices (e.g., servers or other devices), or in one of the devices.

In some implementations, the sensor set 182 may include one or more sensors. The sensor set 182 may collect sensor data. The sensor data may describe, for example, a physical environment of the vehicle 123. The safety system 180 may modify the operation of the vehicle 123 or control the operation of the vehicle 123 based on one or more of the following elements: (1) the sensor data; and (2) the configuration data 172.

In some implementations, the sensor set 182 may include one or more sensors that are operable to measure the physical environment outside of the vehicle 123. For example, the sensor set 182 may record one or more physical characteristics of the physical environment that is proximate to the vehicle 123. The one or more physical characteristics may be recorded directly (e.g., atmospheric pressure, temperature, or any other parameters capable of direct measurement by a vehicle sensor) or indirectly (e.g., an image or sound recording that depicts or describes a physical characteristic of the vehicle environment or an object or event present within the vehicle environment).

In some implementations, the sensor set 182 may include one or more sensors that are operable to measuring the performance of the vehicle 123. For example, the sensor set 182 may record sensor data that describes a speed or acceleration of the vehicle 123.

In some implementations, the sensor set 182 may include one or more of the following vehicle sensors: an external microphone; an internal microphone; an external camera; an internal camera; a LIDAR sensor; a laser altimeter; a navigation sensor (e.g., a global positioning system sensor of the DSRC-compliant GPS unit that is accurate to within 1.5 meters, as opposed to being accurate to within 10 meters as is the case for non-DSRC-compliant GPS units); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The sensor set 182 may be operable to record sensor data that describes one or more locations of the vehicle 123 at one or more different times, images or other measurements of the vehicle environment and objects or other vehicles present in the vehicle environment, etc. The vehicle environment may include the area outside of the vehicle 123 that is proximate to the vehicle 123. For example, the vehicle 123 may be in motion on a roadway and the vehicle environment may include other vehicles that are in front of the vehicle 123, behind the vehicle 123, beside the vehicle 123 or one or more car lengths away from the vehicle 123. The sensor data may be included in the supervisor data 197.

In some implementations, the sensor data may be used to determine the vehicle state. For example, if the sensor data includes images or other data that indicates that the vehicle 123 is present around other vehicles or other obstacles which may be struck by the vehicle 123 due in part to the operation of the safety system 180, thereby causing the safety system 180 to choose to operate the vehicle 123 more conservatively to prevent a collision (e.g., slower speeds, slower acceleration, turning or vehicle steering that is more predictable by other drivers, etc.). This decision may be based in part on the subscription data 170 which describes one or more preferences of the driver 109 for the operation of the safety system 180.

The panel 192 may include an electronic display panel or monitor of the vehicle 123. For example, the panel 192 may include an electronic display panel of a head-unit or heads-up display unit of the vehicle 123.

The heads-up display unit may include a three-dimensional heads-up display unit such as the one described in U.S. patent application Ser. No. 15/080,433 filed on Mar. 24, 2016 and entitled "Wireless Data Sharing Between a Mobile Client Device and a Three-Dimensional Heads-Up Display Unit," the entirety of which is herein incorporated by reference.

The reservation server 104 may include a hardware server. The reservation server 104 may include any processor-based computing device that is executing server software.

In some implementations, the reservation server 104 may provide a service whereby users may schedule an appointment for driving a vehicle 123. For example, the reservation server 104 may be operated by a car rental service, a car sharing service, a ride sharing service or some other service whereby a plurality of users may schedule appointments to drive a vehicle such as the vehicle 123.

The reservation data 198 may include the data that is provided by a user to schedule an appointment for driving a vehicle 123. The reservation data 198 may be stored in a non-transitory memory of the reservation server 104.

The reservation data 198 may include digital data that describes one or more of the following elements of the reservation data 198: a vehicle ID that uniquely identifies a vehicle model that is being reserved (e.g., the make and model of the vehicle 123, the VIN number of the vehicle 123); a user ID that uniquely identifies the driver 109 who is reserving the vehicle; a time or range of times (e.g., start time and end time) when the vehicle associated with the vehicle ID is reserved for use by the user associated with the user ID; one or more user preferences for configuring the safety system 180 of the vehicle that is being reserved (e.g., user preferences for which safety features are to be active during the reserved time period); a preference for a make or model of the vehicle 123; a preference for the operation of the safety system 180 during the time period; and a preference for the financial cost of the reservation.

Figure 4:
FIG. 4 is a block diagram illustrating an example of reservation data according to some implementations.

An example of the reservation data 198 is shown in FIG. 4 according to some implementations.

In some implementations, the preferences of the user may be expressed (and not inferred) at the time of reservation or some other time. For example, the reservation server 104 may cause a panel viewable by the driver 109 (e.g., a panel of the client device 103) to display a GUI which may be used by the driver 109 to input their preferences for the operation of the safety system 180 of the vehicle being reserved by the driver 109. These preferences may be included in the reservation data 198 or the user profile data 112.

The user profile data 112 may include digital data that describes the driver 109 (e.g., a user ID that uniquely identifies the driver 109) and one or more default preferences of the driver 109. The one or more default preferences of the driver 109 may include their default preferences for which safety features are provided by the safety system 180 of vehicles 123 which they reserve using the reservation server 104. These default preferences may describe which safety features the driver 109 is subscribed to by default if the reservation data 198 does not modify the subscribed safety features when scheduling a reservation.

In some implementations, the driver 109 may create an account with the reservation server 104 that includes their user profile data 112. The driver 109 may subsequently reserve a vehicle 123 using the car sharing service provided by the reservation server 104. Reserving the vehicle 123 may include providing the reservation data 198 to the reservation server 104. The reservation data 198 may include a subscription to safety features which are different than their default safety features. In some implementations, the reservation data 198 may not include a described of the subscribed safety features and the subscription data 170 may include the default safety features described by the user profile data 112.

In some implementations, the reservation server 104 may include a game engine. The game engine may beneficially provide the driver 109 with a simulation using their client device 103 (or some other processor-based computing device that is capable of sending and receiving communications via the network 105, such as a gaming console, a personal computer or a set-top box). The game engine may generate graphical data for providing the simulation. The reservation server 104 may transmit the graphical data via the network so that the driver 109 may experience the simulation. The simulation may include a virtual version of the vehicle 123 which is modified so that it provides the safety features which are described by one or more of the reservation data 198 or the user profile data 112. In this way the driver 109 may test drive a virtual version of the vehicle 123 that is modified based on their preferences. This functionality beneficially enables the driver 109 to confirm whether or not they are satisfied with how the real world version of the vehicle 123 will operate if modified as requested by the driver 109 when providing the reservation data 198 and/or the user profile data 112. If the driver 109 is not satisfied, they may update the reservation data 198 and/or the user profile data 112 to include different preferences. If the driver 109 is satisfied, then they may confirm their reservation.

As described in more detail below, in some implementations the reservation server 104 may provide the subscription data 170 to the vehicle 123 so that the vehicle 123 may be customized for the driver 109 prior to the time of their reservation as may be described by the subscription data 170.

In some implementations, the reservation server 104 may include one or more processors that re similar to the processor 125. The reservation server 104 may also include a non-transitory memory that is similar to the memory 127. The non-transitory memory may store one or more of the reservation data 198, the user profile data 112, the subscription data 170 and the subscription system 199. The processor of the reservation server 104 may be communicatively coupled to the non-transitory memory to access and execute the data or information stored in the non-transitory memory.

In some implementations, the car sharing service provided by the reservation server 104 may make a plurality of vehicles 123 available to a plurality of drivers 109. Each vehicle 123 may have a different unique identifier of the vehicle 123 ("vehicle ID" if singular, "vehicle IDs" if plural) and each driver 109 may have a different unique identifier of the driver 109 ("user ID" if singular, "user IDs" if plural). The vehicle IDs and the user IDs may be stored in the non-transitory memory of the reservation server 104 or some other non-transitory data structure.

In some implementations, the subscription system 199 of the reservation server 104 may provide the car sharing service.

Figure 1B:
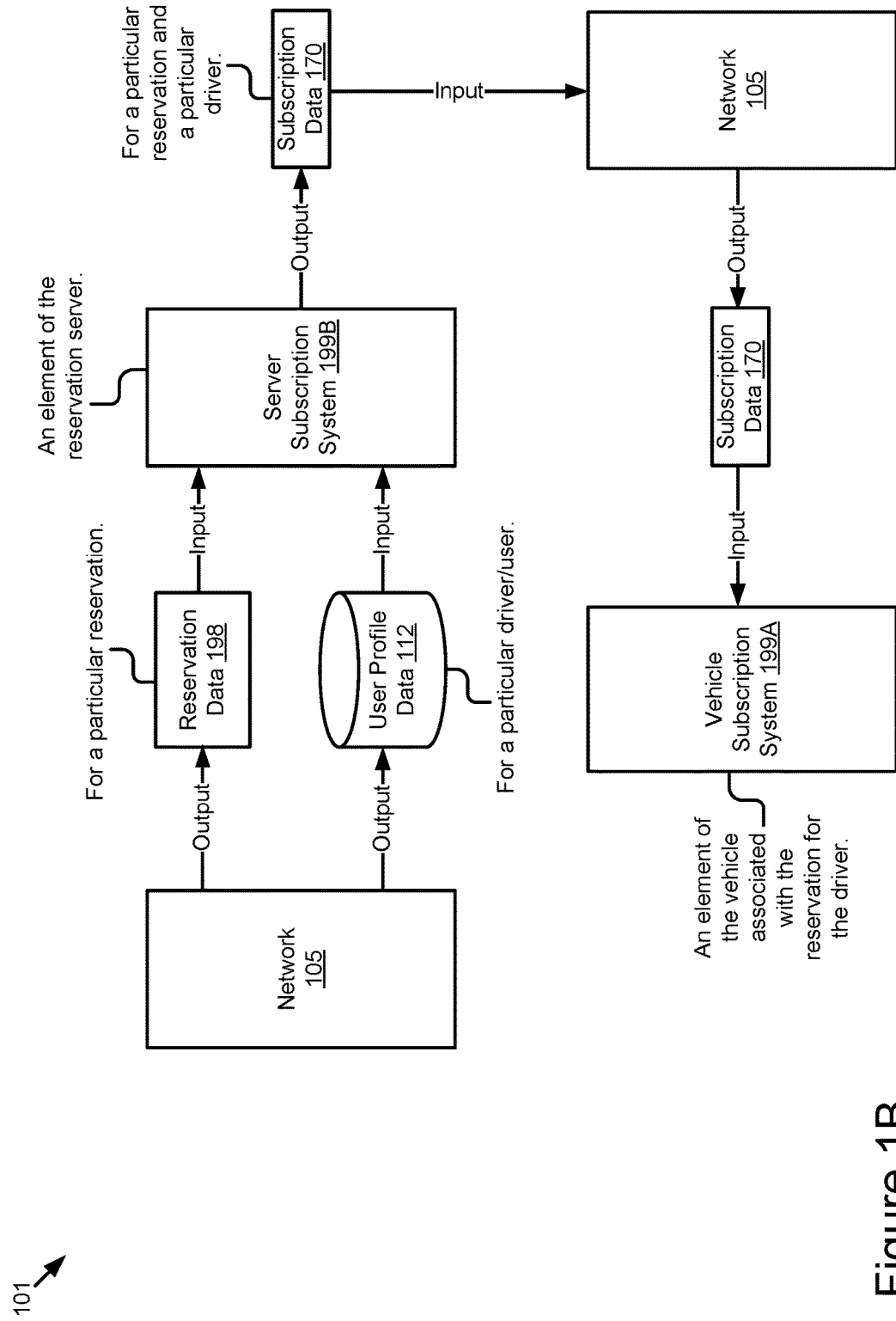
FIG. 1B is a block diagram illustrating process flow for a vehicle subscription system and a server subscription system according to some implementations.

Referring now to FIG. 1B, depicted is a block diagram illustrating process flow 101 for a vehicle subscription system 199A and a server subscription system 199B according to some implementations.

A driver may have a client device. The client device may include a user module. The user module of the client device may provide the reservation data 198 and the user profile data 112 as an input to the network 105. For example, the driver may desire to schedule a reservation with the car sharing service provided by the reservation server. The user profile data 112 may describe which safety features the driver prefers to be operational when they reserve a vehicle. The reservation data 198 may describe the time period for the reservation. The user profile data 112 may be provided at an earlier time than the reservation data 198. The network 105 may output the reservation data 198 and the user profile data 112. The reservation data 198 may be for a particular reservation and the user profile data 112 may be a particular user such as the driver 109. The reservation data 198 and the user profile data 112 may be an input to the server subscription system 199B. The server subscription system 199B may be an element of the reservation server. The server subscription system 199B may output the subscription data 170 based on the reservation data 198 and the user profile data 112. The subscription data 170 may be for the reservation desired by the driver. The subscription data 170 may be inputted to the network 105. The network 105 may output the subscription data 170 to the vehicle subscription system 199A. The vehicle subscription system 199A may be an element of the vehicle associated with the reservation desired by the driver. The vehicle subscription system 199A may modify the configuration data of the safety system of the vehicle based on the subscription data 170 so that the safety system provides only those safety features which are preferred to be active by the driver 109 during the time period of their reservation. This preference may be described by one or more of the reservation data 198 or the user profile data 112. The subscription data 170 may also describe this preference.

Figure 1C:
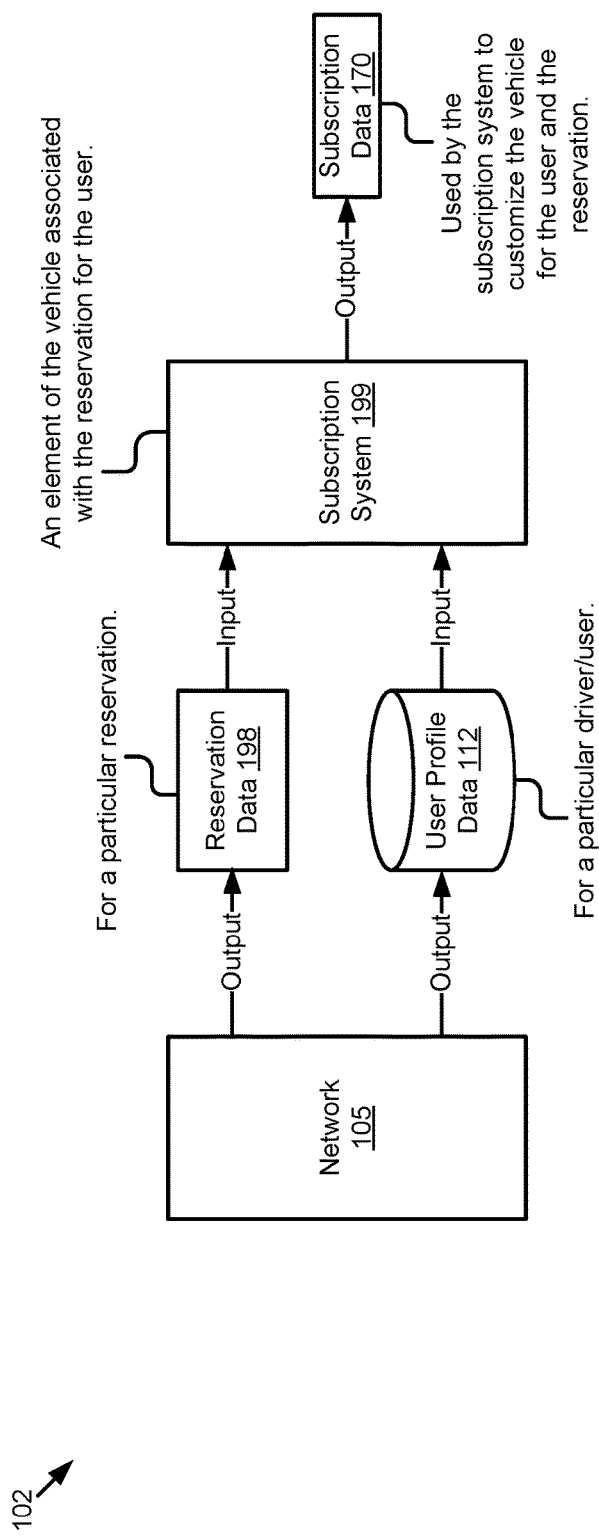
FIG. 1C is a block diagram illustrating process flow for a subscription system according to some implementations.

Referring now to FIG. 1C, depicted is a block diagram illustrating process flow 102 for a subscription system 199 according to some implementations. In FIG. 1C, the subscription system 199 may be an element of the vehicle associated with a reservation. For example, a driver may reserve a vehicle whose safety system is customized based on their preferences without the need of a reservation server as shown in FIG. 1B.

A driver may have a client device. The client device may include a user module. The user module of the client device may provide the reservation data 198 and the user profile data 112 as an input to the network 105. For example, the driver may desire to schedule a reservation with the car sharing service provided by a particular vehicle. The user profile data may describe which safety features the driver prefers to be operational when they reserve the vehicle. The reservation data may describe the time period for the reservation. The user profile data 112 may be provided at an earlier time than the reservation data 198. The network 105 may output the reservation data 198 and the user profile data 112. The reservation data 198 may be for a particular reservation and the user profile data 112 may be a particular user such as the driver 109. The reservation data 198 and the user profile data 112 may be an input to the subscription system 199 which is an element of the vehicle that provides the car sharing service. The subscription system 199 may output the subscription data 170 based on the reservation data 198 and the user profile data 112. The subscription data 170 may be for the reservation desired by the driver. The subscription system 199 may modify the configuration data of the safety system of the vehicle based on the subscription data 170 so that the safety system provides only those safety features which are preferred to be active by the driver 109 during the time period of their reservation. This preference may be described by one or more of the reservation data 198 or the user profile data 112. The subscription data 170 may also describe this preference.

Figure 1D:
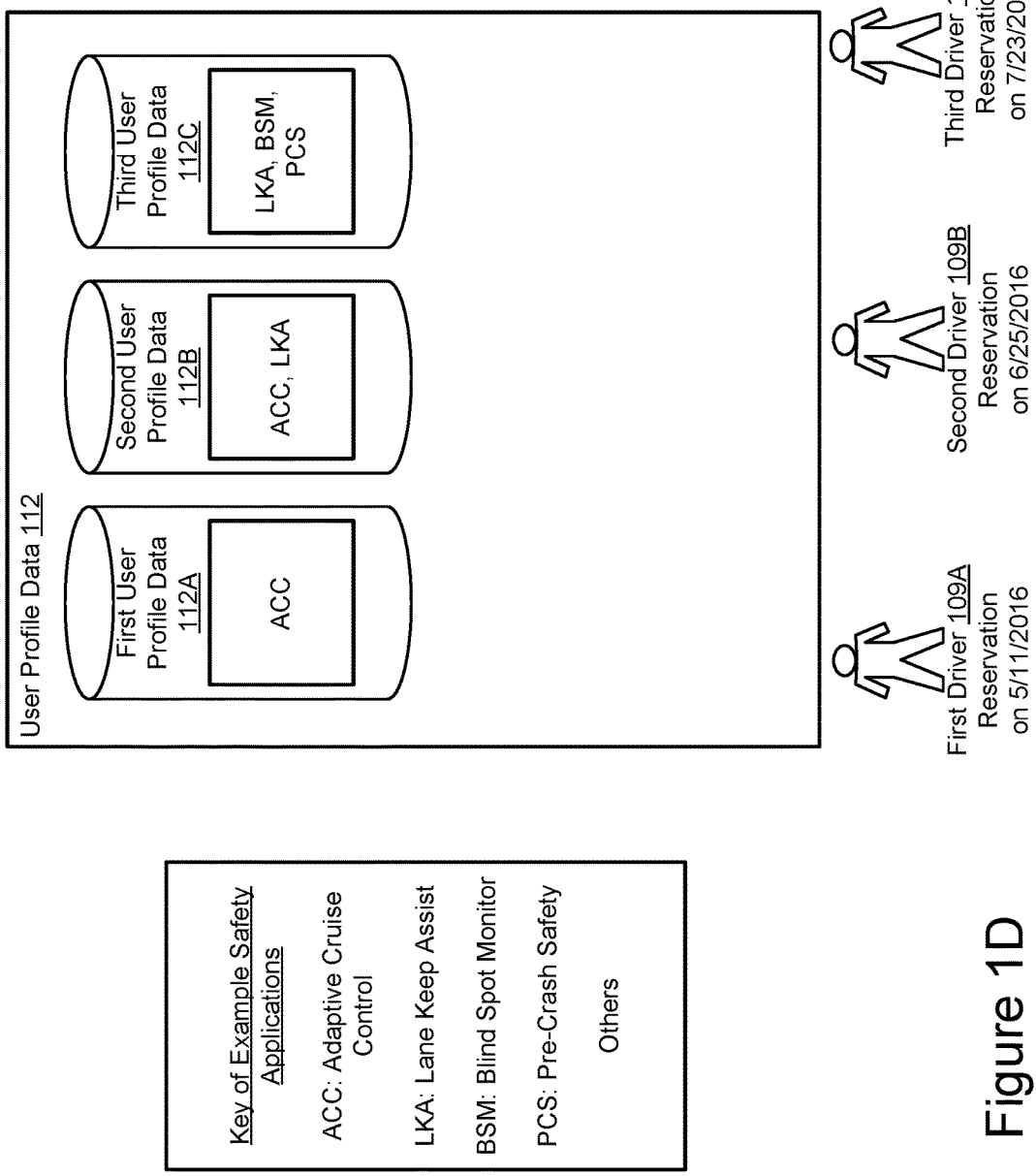
FIG. 1D is a block diagram illustrating example user profile data for a subscription system according to some implementations.

Referring now to FIG. 1D, depicted is a block diagram illustrating example user profile data 112 for a subscription system according to some implementations.

The user profile data 112 may include one or more of the following: a set of first user profile data 112A associated with a first driver 109A; a set of second user profile data 112B associated with a second driver 109B; and a set of third user profile data 112C associated with a third driver 109C. Although only three drivers and three sets of user profile data are depicted in FIG. 1D, in practice there may be any positive whole number of drivers or sets of user profile data associated with these drivers.

The first set of user profile data 112A may indicate that the first driver 109A prefers adaptive cruise control to be active for their reservations. These may be examples of default safety features for the first driver 109A. Other examples are possible. The first driver 109A may have a reservation on May 11, 2016 as described by their reservation data (not pictured). This reservation data may include the user ID for the first driver 109A. The subscription system may use this user ID to retrieve the first set of user profile data 112A for the first driver 109A so that their vehicle is customized for them prior to the time of their reservation.

The second set of user profile data 112B may indicate that the second driver 109B prefers adaptive cruise control and lane keep assistance to be active for their reservations. These may be examples of default safety features for the second driver 109B. Other examples are possible. The second driver 109B may have a reservation on Jun. 25, 2016 as described by their reservation data (not pictured). This reservation data may include the user ID for the second driver 109B. The subscription system may use this user ID to retrieve the second set of user profile data 112B for the second driver 109B so that their vehicle is customized for them prior to the time of their reservation.

The third set of user profile data 112C may indicate that the third driver 109C prefers lane keep assistance, blind spot monitoring and the pre-crash safety system to be active for their reservations. These may be examples of default safety features for the third driver 109C. Other examples are possible. The third driver 109C may have a reservation on Jul. 23, 2016 as described by their reservation data (not pictured). This reservation data may include the user ID for the third driver 109C. The subscription system may use this user ID to retrieve the third set of user profile data 112C for the third driver 109C so that their vehicle is customized for them prior to the time of their reservation.

Figure 2:
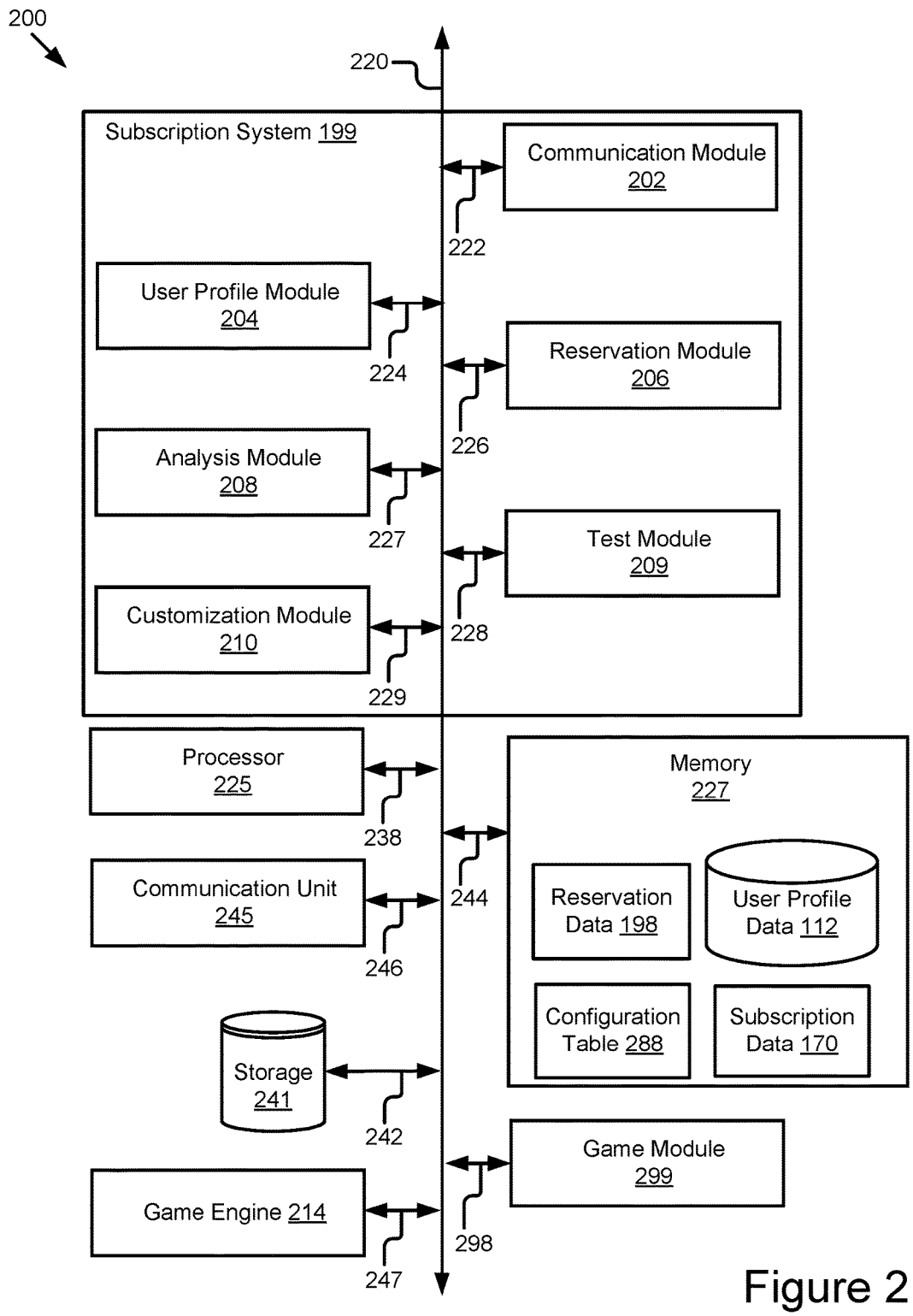
FIG. 2 is a block diagram illustrating an example computer system including an subscription system according to some implementations.

Referring now to FIG. 2, depicted is a block diagram illustrating an example computer system 200 including a subscription system 199 according to some implementations.

In some implementations, the computer system 200 may include a special-purpose computer system that is programmed to perform one or more steps of a method 300 described below with reference to FIGS. 3A and 3B.

In some implementations, the computer system 200 may include the reservation server 104. In some implementations, the reservation server 104 is a cloud server.

In some implementations, the computer system 200 may include an onboard vehicle computer of the vehicle 123. In some implementations, the computer system 200 may include an electronic control unit, head unit or some other processor-based computing device of the vehicle 123.

The computer system 200 may include one or more of the following elements according to some examples: the subscription system 199; a processor 225; a communication unit 245; a storage 241; a game engine 214; a game module 299; a memory 227. The computer system 200 may also include the safety system 180. The components of the computer system 200 are communicatively coupled by a bus 220.

In the illustrated implementation, the processor 225 is communicatively coupled to the bus 220 via a signal line 238. The communication unit 245 is communicatively coupled to the bus 220 via a signal line 246. The game engine 214 is communicatively coupled to the bus 220 via a signal line 247. The storage 241 is communicatively coupled to the bus 220 via a signal line 242. The game module 299 is communicatively coupled to the bus 220 via a signal line 298. The memory 227 is communicatively coupled to the bus 220 via a signal line 244.

The processor 225 includes an arithmetic logic unit, a microprocessor, a general purpose controller, or some other processor array to perform computations and provide electronic display signals to a display device. The processor 225 processes data signals and may include various computing architectures including a complex instruction set computer (CISC) architecture, a reduced instruction set computer (RISC) architecture, or an architecture implementing a combination of instruction sets. Although FIG. 2 includes a single processor 225, multiple processors may be included. The processor 225 may include a graphical processing unit. Other processors, operating systems, sensors, displays, and physical configurations may be possible.

The memory 227 stores instructions or data that may be executed by the processor 225. The instructions or data may include code for performing the techniques described herein. The memory 227 may be a dynamic random access memory (DRAM) device, a static random access memory (SRAM) device, flash memory, or some other memory device. In some implementations, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2, the memory 227 stores one or more of the following elements: the reservation data 198; the user profile data 112; a configuration table 288; and subscription data 170. The following elements were described above with reference to FIGS. 1A and 1B, and so, those descriptions will not be repeated here: the reservation data 198; the user profile data 112; the subscription data 170.

The configuration table 288 may include digital data that describes, for different makes and models of different vehicles, the safety features that are available for these and the configuration data of these vehicles. The reservation data 198 may include a vehicle ID that identifies which vehicle is reserved by the driver. The subscription system 199 may analyze the configuration table 288 with the user profile data 112 to determine how to modify the configuration data for the vehicle associated with the vehicle ID so that the safety system of the vehicle provides the safety features requested by the driver (as described by the user profile data 112 and/or the reservation data 198). The subscription system 199 may generate the subscription data 170 based on this analysis. In this way, the subscription system 199 may generate subscription data 170 that is operable to modify the configuration data for a reserved vehicle so that the safety system for the reserved vehicle operates in conformity with one or more preferences of the driver (e.g., which safety features should be active during the time period of the reservation).

The communication unit 245 may include hardware that transmits and receives data to and from the network 105. In some implementations, the communication unit 245 includes a port for direct physical connection to the network 105 or to another communication channel. For example, the communication unit 245 includes a USB, SD, CAT-5, or similar port for wired communication with the network 105. In some implementations, the communication unit 245 includes a wireless transceiver for exchanging data with the network 105 or other communication channels using one or more wireless communication methods, including IEEE 802.11, IEEE 802.16, Bluetooth, or another suitable wireless communication method.

In some implementations, the communication unit 245 includes a port for direct physical connection to the network 105 or to another communication channel. For example, the communication unit 245 includes a USB, SD, CAT-5, or similar port for wired communication with the network 105.

In some implementations, the communication unit 245 includes a wireless transceiver for exchanging data with the network 105 or other communication channels using one or more wireless communication methods, including: IEEE 802.11; IEEE 802.16, Bluetooth; EN ISO 14906:2004 Electronic Fee Collection—Application interface EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some implementations, the communication unit 245 may include a full-duplex coordination system as described in U.S. patent application Ser. No. 14/471,387 filed on Aug. 28, 2014 and entitled "Full-Duplex Coordination System."

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, millimeter wave, DSRC, etc.

The game engine 214 may be a cross-platform game engine. An example of a cross-platform game engine includes the Unity game engine developed by Unity Technologies of San Francisco, Calif. The game engine 214 may generate graphical data for providing a simulated driving experience that includes a virtualized vehicle driving on a virtualized roadway system.

The storage 241 can be a non-transitory storage medium that stores data for providing the functionality described herein. The storage 241 may be a dynamic random access memory (DRAM) device, a static random access memory (SRAM) device, flash memory, or some other memory devices. In some implementations, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The game module 299 may include code and routines configured to receive the graphical data generated by the game engine and generate a graphical output for viewing by the driver that provides the simulated driving experience that includes the virtualized vehicle driving on the virtualized roadway system. For example, the computer system 200 is a client device and the game module 299 may include a thin client operable on a client device that generates a gaming experience using the graphical data of the game engine 214.

In the illustrated implementation shown in FIG. 2, the subscription system 199 includes a communication module 202, a user profile module 204, a reservation module 206, an analysis module 208, a test module 209 and a customization module 210. These components of the subscription system 199 are communicatively coupled to each other via the bus 220. In some implementations, components of the subscription system 199 can be stored in a single server or device.

In some other implementations, components of the subscription system 199 can be distributed and stored across multiple servers or devices.

The communication module 202 can be software including routines for handling communications between the subscription system 199 and other components of the computer system 200. In some implementations, the communication module 202 can be a set of instructions executable by the processor 225 to provide the functionality described below for handling communications between the subscription system 199 and other components of the computer system 200 or the operating environment 100. In some implementations, the communication module 202 can be stored in the memory 227 of the computer system 200 and can be accessible and executable by the processor 225. The communication module 202 may be adapted for cooperation and communication with the processor 225 and other components of the computer system 200 via signal line 222.

The communication module 202 sends and receives data, via the communication unit 245, to and from one or more elements of the computer system 200 or the network 105. For example, the communication module 202 receives, via the communication unit 245, one or more of the following: the reservation data 198; the user profile data 112; and the subscription data 170.

In some implementations, the communication module 202 receives data from components of the subscription system 199 and stores the data in one or more of the storage 241 and the memory 227. For example, the communication module 202 receives the subscription data 170 from the analysis module 208 and stores the subscription data 170 in the memory 227.

In some implementations, the communication module 202 may handle communications between components of the subscription system 199 or the computer system 200.

The user profile module 204 can be software including routines for generating one or more sets of user profile data 112 for one or more drivers. The user profile module 204 may receive user profile data 112 for one or more drivers and generate different sets of user profile data for these different drivers (see, e.g., FIG. 1D). The user profile module 204 may generate user IDs for the different drivers. The user profile module 204 may manage login credentials for the drivers. The user ID and login credentials may be elements of the user profile data for each driver. A driver having a user profile generated by the user profile module 204 may be a "registered driver" or a "registered user." In some implementations, the user profile data 204 can be stored in the memory 227 of the computer system 200 and can be accessible and executable by the processor 225. The user profile module 204 may be adapted for cooperation and communication with the processor 225 and other components of the computer system 200 via signal line 224.

The reservation module 206 can be software including routines for reserving vehicles for drivers based on their reservation data 198. For example, the memory 227 may store a reservation table or some other data structure that includes each of the available vehicles (each having a unique vehicle ID) and the time periods when these vehicles are available. The reservation module 206 may receive reservation data 198 including a description of a desired vehicle and a time period when the vehicle is requested for reservation. The reservation module 206 may identify a vehicle ID for a vehicle that matches the vehicle description (in whole or in part) and is available for reservation during the time period requested by the driver. The reservation module 206 may store data in the reservation table that indicates that the identified vehicle is reserved for the driver associated with the reservation data 198 (e.g., because the reservation data 198 includes the user ID for the driver). This data may be included in the reservation data 198 that is stored in the memory 227. In this way the reservation module 206 may generate a reservation for a driver.

In some implementations, the reservation module 206 may charge a credit card or some other payment for in exchange for the reservation. The price of the reservation may vary based on the safety features which are active for the driver during the reservation.

In some implementations, the reservation module 206 can be stored in the memory 227 of the computer system 200 and can be accessible and executable by the processor 225. The reservation module 206 may be adapted for cooperation and communication with the processor 225 and other components of the computer system 200 via signal line 226.

The analysis module 208 can be software for analyzing the configuration table 288 to generate subscription data 170 for a particular combination of user profile data 112 and reservation data 198. In some implementations, the analysis module 208 can be stored in the memory 227 of the computer system 200 and can be accessible and executable by the processor 225. The analysis module 208 may be adapted for cooperation and communication with the processor 225 and other components of the computer system 200 via signal line 227.

The test module 209 can be software including routines for causing the game engine 214 to generate the simulation for testing whether the vehicle, as modified by the subscription data 170, performs as desired by the driver who requested the reservation.

In some implementations, the test module 209 can be stored in the memory 227 of the computer system 200 and can be accessible and executable by the processor 225. The test module 209 may be adapted for cooperation and communication with the processor 225 and other components of the computer system 200 via signal line 228.

The customization module 210 can be software including routines for performing one or more of the following steps: receiving the subscription data 170 for a particular reservation; and modifying the configuration data of the safety system of the vehicle based on the subscription data 170 prior to the start time of the reservation.

In some implementations, the customization module 210 can be stored in the memory 227 of the computer system 200 and can be accessible and executable by the processor 225. The customization module 210 may be adapted for cooperation and communication with the processor 225 and other components of the computer system 200 via signal line 229.

Figure 3A:
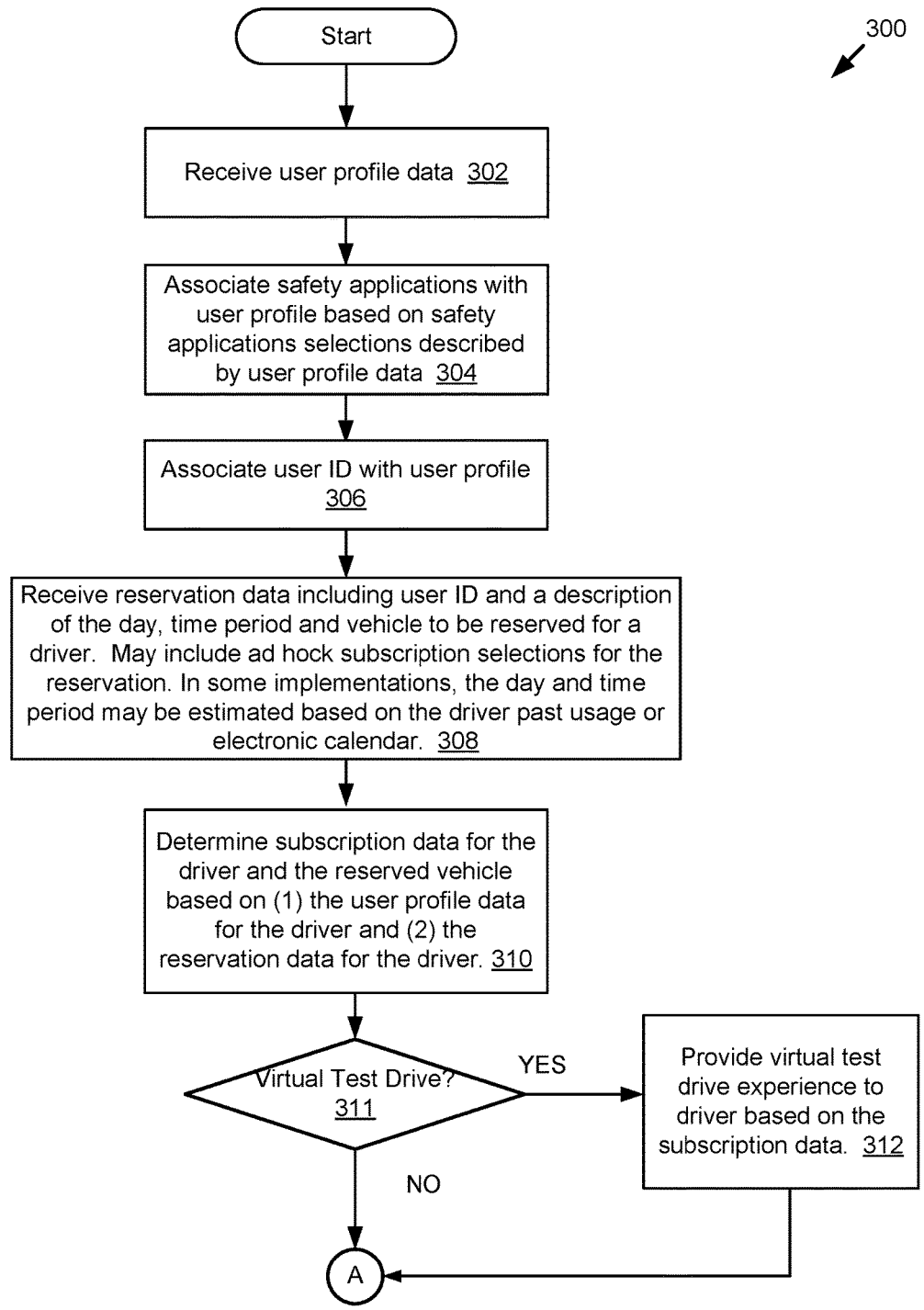
FIGS. 3A and 3B are a flowchart of an example method for configuring a safety system based on subscription data for a reservation of a car sharing service according to some implementations.
Figure 3B:
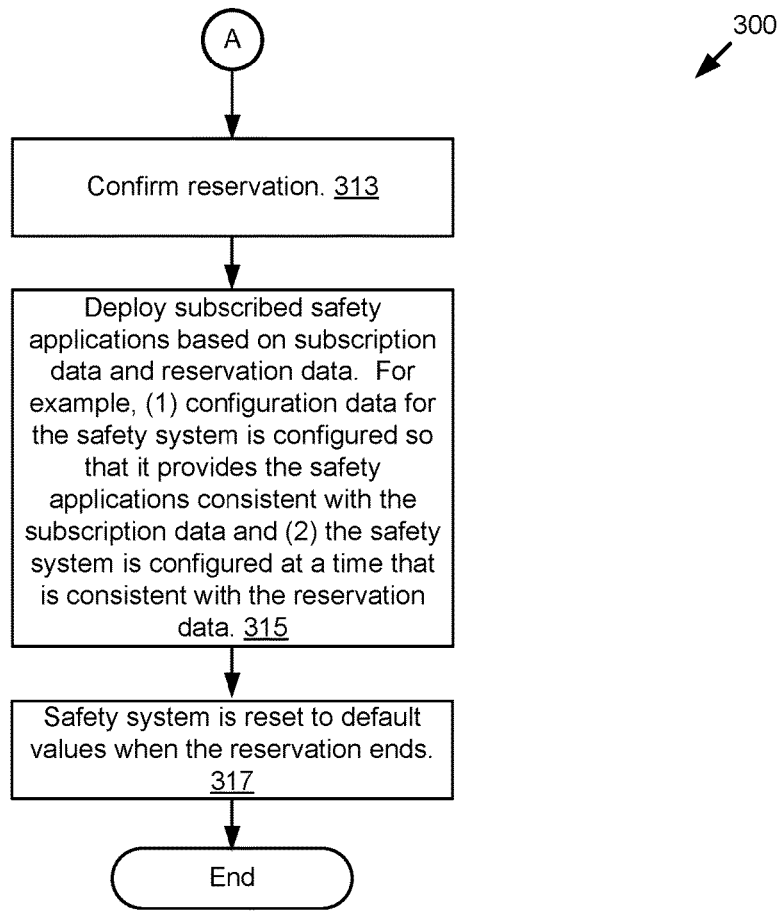

Referring now to FIGS. 3A and 3B, depicted is a flowchart of an example method 300 for configuring a safety system based on subscription data for a reservation of a car sharing service according to some implementations.

At step 302, user profile data is received. A user profile may be generated for a driver based on the user profile data. At step 304, safety applications or safety features may be associated with the user profile for the driver based on the user profile data. These may include the default safety features which the driver has selected as described by the user profile data. At step 306 a user ID may be associated with the user profile.

At step 308, reservation data may be received. The reservation data may include a user ID and a description of the day, time period and vehicle to be reserved for a driver associated with the user ID. The reservation data may optionally include ad hock subscription selections for the reservation. The ad hock subscription selections may include one or more selections for safety features that vary from the default safety features identified by the user profile of the driver. In some implementations, the subscription system may estimate the day or time for the reservation based on the past reservations of the driver or an electronic calendar of the driver which is synchronized with the subscription system so that the appointments of the driver and locations for the appointments are known to the subscription system.

At step 310, subscription data for the driver and the reserved vehicle may be determined based on the user profile data and the reservation data.

At step 311, a determination is made regarding whether to provide the driver with a virtual test drive. For example, the user profile data for the driver may indicate that they prefer to receive a virtual test drive.

If a determination is made at step 311 to provide a virtual test drive, then the method 300 proceeds to step 312. At step 312 the virtual time drive experience is provided to the driver using a game engine.

If a determination is made at step 311 to not provide a virtual test drive, then the method 300 proceeds to step 313 depicted at FIG. 3B.

Referring now to FIG. 3B, at step 313 the reservation may be confirmed. For example, if the driver approves of the test drive and/or the price or vehicle for the reservation, then the reservation is confirmed.

At step 315, one or more safety applications may be deployed by modifying the configuration data for the safety system of the reserved vehicle prior to the start time of the reservation so that the vehicle is customized for the driver during the time period of the reservation.

At step 317, the reservation ends and the configuration data of the safety system are reset to the default values so that the vehicle is no longer customized for the driver.

Referring now to FIG. 4, depicted is a block diagram illustrating an example of reservation data 198 according to some implementations.

The reservation data 198 may include one or more of the following: a vehicle ID; a user ID; a reservation time (e.g., a start time and optionally an end time); and, optionally, the user preferences for the operation of the ADAS systems included in the safety system of the reserved vehicle identified by the vehicle ID.

Referring now to FIG. 1A, one or more of the following devices may be a communication device: a vehicle 123; a reservation server 104 and a client device 103. Regarding U.S. patent application Ser. No. 14/471,387 filed on Aug. 28, 2014 and entitled "Full-Duplex Coordination System," which is herein incorporated by reference, in a half-duplex communication system, a first communication device currently transmitting data to a second communication device is not capable of simultaneously receiving data from the second communication device. If the second communication device has data to transmit to the first communication device, the second communication device needs to wait until the first communication device completes its data transmission. Only one communication device is allowed to transmit data at one time in the half-duplex communication system.

In a standard IEEE 802.11 Wireless Local Area Network (WLAN), communication devices may compete for access to a wireless channel based on the Carrier Sense Multiple Access with Collision Avoidance (CSMA/CA) Medium Access Control (MAC) protocol. The IEEE 802.11 MAC protocol requires that only one communication device may use the wireless channel to transmit data at one time. If two or more communication devices transmit data over the wireless channel at the same time, a collision occurs. As a result, only the communication device that currently gains access to the wireless channel may use the wireless channel to transmit data. Other communication devices having data to transmit need to monitor the wireless channel and may compete for access to the wireless channel when the wireless channel becomes idle again.

According to one innovative aspect of the subject matter described in this disclosure, the vehicle 123, the reservation server 104 and the client device 103 and other communication devices as described above may include a full duplex coordination system for implementing full-duplex wireless communications. The full duplex coordination system may include a processor and a memory storing instructions that, when executed, cause the full duplex coordination system to: create, at a first communication device (such as the client device 103), first data (such as the reservation data 198 and/or the user profile data 112) to transmit to a second communication device (such as a the reservation server 104 or the vehicle 123, etc.); switch a half-duplex operation mode of the first communication device to a full-duplex operation mode to activate the full-duplex operation mode of the first communication device; transmit a first portion of the first data from the first communication device to the second communication device using a wireless channel; and transmit, in the full-duplex operation mode of the first communication device, a remaining portion of the first data to the second communication device while simultaneously receiving second data (such as any combination of the data stored on the memory 227) from the second communication device using the wireless channel.

According to another innovative aspect of the subject matter described in this disclosure, a full duplex coordination system for implementing full-duplex wireless communications includes a processor and a memory storing instructions that, when executed, cause the full duplex coordination system to: receive a first portion of first data (such as any combination of the data stored on the memory 227) from a first communication device via a wireless channel; determine that a second communication device is a single destination of the first data based on the first portion of the first data; determine that the second communication device has second data (such as any combination of the data stored on the memory 227) to transmit to the first communication device; determine that the first communication device has full-duplex communication capability; switch a half-duplex operation mode of the second communication device to a full-duplex operation mode to activate the full-duplex operation mode of the second communication device; and transmit, in the full-duplex operation mode of the second communication device, the second data to the first communication device while simultaneously receiving a remaining portion of the first data from the first communication device using the wireless channel.

In general, another innovative aspect of the subject matter described in this disclosure may be embodied in methods that include: creating, at a first communication device, first data to transmit to a second communication device; switching a half-duplex operation mode of the first communication device to a full-duplex operation mode to activate the full-duplex operation mode of the first communication device; transmitting a first portion of the first data from the first communication device to the second communication device using a wireless channel; and transmitting, in the full-duplex operation mode of the first communication device, a remaining portion of the first data to the second communication device while simultaneously receiving second data from the second communication device using the wireless channel.

Yet another innovative aspect of the subject matter described in this disclosure may be embodied in methods that include: receiving a first portion of first data from a first communication device via a wireless channel; determining that a second communication device is a single destination of the first data based on the first portion of the first data; determining that the second communication device has second data to transmit to the first communication device; determining that the first communication device has full-duplex communication capability; switching a half-duplex operation mode of the second communication device to a full-duplex operation mode to activate the full-duplex operation mode of the second communication device; and transmitting, in the full-duplex operation mode of the second communication device, the second data to the first communication device while simultaneously receiving a remaining portion of the first data from the first communication device using the wireless channel.

Another innovative aspect of the subject matter described in this disclosure may be embodied in methods that include: determining first data to transmit from a first communication device to a second communication device; and transmitting, from the first communication device that operates in a full-duplex operation mode, the first data to the second communication device while simultaneously receiving second data from the second communication device using a common wireless channel.

Another innovative aspect of the subject matter described in this disclosure may be embodied in methods that include: receiving, from a first communication device, first data at a second communication device via a wireless channel; determining second data to transmit from the second communication device to the first communication device responsive to receiving at least a portion of the first data; and transmitting, from the second communication device that operates in a full-duplex operation mode, the second data to the first communication device using the wireless channel while simultaneously receiving the first data from the first communication device.

Another innovative aspect of the subject matter described in this disclosure may be embodied in methods that include: determining, at a first communication device, first data to transmit to a second communication device; switching the first communication device from a half-duplex operation mode to a full-duplex operation mode; transmitting, in the full-duplex operation mode of the first communication device, the first data to the second communication device while simultaneously receiving second data from the second communication device using the wireless channel; and switching the full-duplex operation mode of the first communication device to the half-duplex operation mode responsive to a determination that transmission of the first data completes.

Another innovative aspect of the subject matter described in this disclosure may be embodied in methods that include: receiving, from a first communication device, first data at a second communication device via a wireless channel; determining that the second communication device has second data to transmit to the first communication device; switching the second communication device from a half-duplex operation mode to a full-duplex operation mode; transmitting, in the full-duplex operation mode of the second communication device, the second data to the first communication device while simultaneously receiving the first data from the first communication device using the wireless channel; and switching the full-duplex operation mode of the second communication device to the half-duplex operation mode responsive to a determination that transmission of the second data completes.

Other aspects include corresponding methods, systems, apparatus, and computer program products for these and other innovative aspects.

These and other implementations may each optionally include one or more of the following operations and features. For instance, the features include: the first data including a first packet and the first portion of the first data including a header portion of the first packet; the remaining portion of the first data including a payload portion and a trailer portion of the first packet; determining that the second communication device is a single destination of the first data; activating the full-duplex operation mode of the first communication device responsive to the second communication device being the single destination of the first data; the first communication device and the second communication device being communication devices in a wireless local area network; determining that the first communication device operates in a regulated spectrum where full-duplex communication capability is required; receiving device registry data associated with the first communication device; determining that the first communication device has full-duplex communication capability based on the device registry data; and determining that the first communication device has full-duplex communication capability based on a capability indication field in the first portion of the first data, the capability indication field including data describing whether the first communication device has full-duplex communication capability.

For instance, the operations include: determining that the wireless channel is idle; and accessing the wireless channel for data communication between the first communication device and the second communication device based on a channel access rule.

The disclosure is particularly advantageous in a number of respects. For example, the system described herein is capable of achieving a higher throughput and a faster communication speed using full-duplex communication technologies rather than using half-duplex communication technologies. The full-duplex communication may be implemented between vehicles (e.g., communication systems installed in a vehicle 123 such as is depicted in FIG. 1A) or other communication devices that have full-duplex communication capability. In another example, the system coordinates communication between communication devices in a distributed way without using a central coordinator. The system determines a pair of communication devices and coordinates simultaneous transmission of data between the pair of communication devices so that the pair of communication devices may transmit data to each other simultaneously using the same wireless channel. Meanwhile, other communication devices may not transmit data over the wireless channel to avoid collision. The advantages of the system described herein are provided by way of example, and the system may have numerous other advantages.

The disclosure includes a system and method for implementing full-duplex wireless communications between communication devices. A full-duplex coordination system may include a processor and a memory storing instructions that, when executed, cause the full-duplex coordination system to: create, at a first communication device, first data to transmit to a second communication device; switch a half-duplex operation mode of the first communication device to a full-duplex operation mode to activate the full-duplex operation mode of the first communication device; transmit a first portion of the first data from the first communication device to the second communication device using a wireless channel; and transmit, in the full-duplex operation mode of the first communication device, a remaining portion of the first data to the second communication device while simultaneously receiving second data from the second communication device using the wireless channel.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present implementations can be described above primarily with reference to user interfaces and particular hardware. However, the present implementations can apply to any type of computer system that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present implementations of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations or some implementations containing both hardware and software elements. In some preferred implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A system comprising:
a vehicle communicatively coupled to a reservation server via a wireless network; and
a client device communicatively coupled to the reservation server via the wireless network;
wherein the client device includes a client module that is operable to receive one or more inputs from a driver that define user profile data for the driver and reservation data for the driver, wherein the user profile data describes a subset of a plurality of safety features for the vehicle that the driver prefers to be active;
wherein the client module is operable to provide a simulated driving experience for a virtual version of the vehicle that was modified based on the subset of the plurality of safety features for the vehicle that the driver prefers to be active and, responsive to the driver approving of the simulated driving experience, confirming a reservation of the vehicle;
wherein the reservation server includes a server subscription system that is operable to receive the reservation data and the user profile data from the wireless network and generate subscription data for the vehicle based on the reservation data and the user profile data and transmit the subscription data to the vehicle via the wireless network;
wherein the subscription data describes the reservation for the driver and the subset of the plurality of safety features for the vehicle that the driver prefers to be active;
wherein the vehicle includes a safety system and a vehicle subscription system;
wherein the safety system is operable to provide the plurality of safety features for an operation of the vehicle based on configuration data that defines which of the plurality of safety features are provided by the safety system during the operation of the vehicle; and
wherein the vehicle subscription system is operable to receive the subscription data from the wireless network and modify the configuration data for the safety system based on the subscription data.

2. The system of claim 1, wherein the vehicle includes a processor and the safety system includes code and routines that are operable, when executed by the processor, to cause the processor to generate a plurality of in-vehicle virtual electronic control units that are programmed to provide the subset of the plurality of safety features based on the configuration data as modified by the subscription system.

3. The system of claim 1, wherein the safety system includes a plurality of subsystems that provide the safety features, and the plurality of subsystems include two or more of the following: an adaptive cruise control system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; a pre-crash safety system; and a wrong-way driving warning system.

4. The system of claim 1, wherein the reservation server is operated by a car sharing service.

5. The system of claim 4, wherein the vehicle is available for reservation by a plurality of users through the car sharing service.

6. The system of claim 4, wherein the client device includes a smartphone and the client module includes a smartphone application for the car sharing service.

7. The system of claim 1, wherein the reservation server includes a game engine that is operable to provide the simulated driving experience and the client module is operable to communicate with the game engine via the wireless network to receive graphical data from the game engine that causes the client module to display interactive graphical images on the client device which provide the simulated driving experience to the driver so that the driver can confirm correctness of the user profile data.

8. A system comprising:
a vehicle including a safety system, a subscription system and a communication unit;
wherein the safety system is operable to provide a plurality of safety features for an operation of the vehicle based on configuration data that defines which of the plurality of safety features are provided by the safety system during the operation of the vehicle;
wherein the communication unit receives user profile data from a wireless network and the user profile data describes a set of safety features to be activated when a driver operates the vehicle and the set of safety features are selected by the driver from the plurality of safety features so that the safety system operates in accordance with one or more preferences of the driver;
wherein the subscription system receives a confirmation of a reservation responsive to a client module providing a simulated driving experience for a virtual version of the vehicle that was modified based on a subset of the plurality of safety features for the vehicle that the driver prefers to be active and responsive to the driver approving of the simulated driving experience; and
wherein the subscription system is communicatively coupled to the communication unit to receive the user profile data from the communication unit and modify the configuration data based on the user profile data so that the safety system provides the set of safety features selected by the driver from the plurality of safety features so that the safety system operates the vehicle in accordance with the one or more preferences of the driver.

9. A method for providing subscription-based safety features in car sharing, the method comprising:
receiving, by a communication unit of a vehicle, subscription data describing how to modify an operation of a safety system of the vehicle based on one or more preferences of a driver for the operation of the safety system, wherein the safety system is operable to provide a plurality of safety features during the operation of the vehicle based on configuration data that defines which of the plurality of safety features are provided by the safety system during the operation of the vehicle and the subscription data describes a reservation for the driver and a subset of the plurality of safety features for the vehicle that the driver prefers to be active;
providing a simulated driving experience for a virtual version of the vehicle that was modified based on the subset of the plurality of safety features for the vehicle that the driver prefers to be active;
responsive to the driver approving of the simulated driving experience, confirming the reservation; and
modifying, by a processor of the vehicle, the configuration data of the safety system based on the subscription data, wherein the modifying of the configuration data results in the safety system providing only the subset of the plurality of safety features when the vehicle is operated by the driver.

10. The method of claim 9, further comprising analyzing, by the processor of the vehicle, the subscription data to determine which portions of the configuration data to modify based on the subscription data to conform to the one or more preferences of the driver as described by the subscription data, wherein the modifying of the configuration data by the processor of the vehicle occurs responsive to the determination of which portions of the configuration data to modify so that the operation of the safety system conforms with the one or more preferences of the driver.

11. The method of claim 9, wherein the configuration data as modified, when executed by the processor, causes the processor to generate a plurality of in-vehicle virtual electronic control units that are programmed to provide the subset of the plurality of safety features based on the configuration data as modified by the processor.

12. The method of claim 9, wherein the safety system includes a plurality of subsystems that provide the safety features, and the plurality of subsystems include two or more of the following: an adaptive cruise control system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; a pre-crash safety system; and a wrong-way driving warning system.

13. The method of claim 9, wherein the car sharing service operates a reservation server that provides a wireless message that includes the subscription data.

14. The method of claim 9, wherein the vehicle is available for reservation by a plurality of users through the car sharing service.

15. The method of claim 9, wherein the driver has a smartphone that includes a smartphone application that is operable to reserve the vehicle with the car sharing service.

16. The method of claim 9, further comprising a reservation server that receives user profile data from the driver describing the one or more safety features which the driver has subscribed to when reserving the vehicle with the car sharing service, wherein the reservation server generates the subscription data based at least in part on the user profile data and provides a wireless message including the subscription data to a wireless network.

17. The method of claim 16, further comprising a client module that is operable by a client device of the driver, wherein the reservation server includes a game engine that is operable to provide the simulated driving experience for the virtual version of the vehicle that is modified based on the subset of the plurality of safety features for the vehicle that the driver prefers to be active and the client module is operable to communicate with the game engine via a wireless network to receive graphical data from the game engine that causes the client module to display interactive graphical images on the client device which provide the simulated driving experience to the driver so that the driver can confirm correctness of the user profile data.

18. A computer program product of a vehicle comprising a non-transitory memory storing computer-executable code that, when executed by a processor of the vehicle, causes the processor to:
receive a confirmation of a reservation responsive to a client module providing a simulated driving experience for a virtual version of the vehicle that was modified based on a subset of a plurality of safety features for the vehicle that a driver prefers to be active and responsive to the driver approving of the simulated driving experience;
receive subscription data describing how to modify an operation of a safety system of the vehicle based on one or more preferences of the driver for the operation of the safety system, wherein the safety system is operable to provide the plurality of safety features during the operation of the vehicle based on configuration data that defines which of the plurality of safety features are provided by the safety system during the operation of the vehicle and the subscription data describes the subset of the plurality of safety features for the vehicle that the driver prefers to be active; and
modifying, by the processor of the vehicle, the configuration data of the safety system, wherein the modifying of the configuration data configures the safety system to provide only the subset of the plurality of safety features when the vehicle is operated so that the operation of the safety system conforms to one or more safety features which the driver has subscribed to when reserving the vehicle.

19. The computer program product of claim 18, wherein the configuration data as modified, when executed by the processor of the vehicle, causes the processor to generate a plurality of in-vehicle virtual electronic control units that are programmed to provide the subset of the plurality of safety features based on the configuration data as modified by the processor of the vehicle.

20. The computer program product of claim 18, further comprising a smartphone application is included in the client module and a reservation server that is operated by a car sharing service, wherein the smartphone application is communicatively coupled to the reservation server via a wireless network, wherein the driver provides inputs to the smartphone application via the smartphone that define (1) reservation data that describes a time period for reserving the vehicle for the driver and (2) user profile data that describes the subset of the plurality of safety features for the vehicle that the driver prefers to be active during the time period, wherein the smartphone application transmits the user profile data and the reservation data to the reservation server via the wireless network to reserve the vehicle with the car sharing service during the time period and cause the safety system of the vehicle to be configured based on the user profile data, wherein the subscription data is generated by the reservation server based on the reservation data and the user profile data, wherein the reservation server includes a game engine that is operable to provide the simulated driving experience and the smartphone application is operable to communicate with the game engine via the wireless network to receive graphical data from the game engine that causes the smartphone to display interactive graphical images on the smartphone which provide the simulated driving experience to the driver so that the driver has an opportunity to ascertain a correctness of the user profile data and provide an input describing the correctness of the user profile data prior to the time period associated with their reservation of the vehicle based on a performance of the virtual version of the vehicle in the simulated driving experience provided by the game engine.

* * * * *